(12) United States Patent
Withers et al.

(10) Patent No.: US 10,254,884 B2
(45) Date of Patent: Apr. 9, 2019

(54) APPARATUS FOR PIEZOELECTRIC FORCE DETECTION

(71) Applicant: QUALCOMM Incorporated, San Diego, CA (US)

(72) Inventors: Richard Stacy Withers, Sunnyvale, CA (US); Kevin Johnson, Escondido, CA (US); David Johnson, Cupertino, CA (US); Rizwan Muhammad Khan Afridi, San Jose, CA (US); Adithya Naresh, Hayward, CA (US); Ronald Scott Lee, San Francisco, CA (US); Mark Bisbee, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 15/357,753

(22) Filed: Nov. 21, 2016

(65) Prior Publication Data

US 2018/0143728 A1 May 24, 2018

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
CPC ........ G06F 3/041; G06F 3/0412; G06F 3/043; G06F 3/044; G06F 3/0414; G06F 3/045;
(Continued)

(56) References Cited

U.S. PATENT DOCUMENTS

| 9,213,434 B2 | 12/2015 | Yliaho et al. |
| 9,262,003 B2 | 2/2016 | Kitchens et al. |

(Continued)

FOREIGN PATENT DOCUMENTS

| EP | 2902886 A1 | 8/2015 |
| WO | WO-2014098946 A1 | 6/2014 |

(Continued)

OTHER PUBLICATIONS

International Search Report and Written Opinion—PCT/US2017/057149—ISA/EPO—dated Jan. 29, 2018.

*Primary Examiner* — Chanh D Nguyen
*Assistant Examiner* — Nguyen H Truong
(74) *Attorney, Agent, or Firm* — Harrity & Harrity, LLP

(57) ABSTRACT

Certain aspects of the present disclosure generally relate to a touch panel. The touch panel may include a cover layer, of a plurality of layers, configured to receive a touch force applied to the touch panel. The touch panel may include a force determination set of layers, of the plurality of layers, to determine a magnitude of the touch force applied to the touch panel. The force determination set of layers may include a piezoelectric layer with a set of force determination pixels. The set of force determination pixels may be arranged in a matrix to address the set of force determination pixels. A force determination pixel may be configured to generate a charge for determining a location of the touch force applied to the touch panel and a magnitude of the touch force applied to the touch panel.

30 Claims, 9 Drawing Sheets

(52) U.S. Cl.
CPC .. *G06F 3/0414* (2013.01); *G06F 2203/04105* (2013.01); *G06F 2203/04112* (2013.01)

(58) Field of Classification Search
CPC ........ G06F 1/16; G06F 1/3262; G06F 1/3231; H03K 17/96; H01H 13/14; H01H 65/00; G06K 19/07; G01R 27/26; G01S 15/89; G01S 7/521
See application file for complete search history.

(56) References Cited

U.S. PATENT DOCUMENTS

| | | |
|---|---|---|
| 2006/0262099 A1 | 11/2006 | Destura et al. |
| 2008/0309631 A1 | 12/2008 | Westerman et al. |
| 2014/0247231 A1* | 9/2014 | Lin ....................... G06F 3/0414 345/173 |
| 2015/0234446 A1 | 8/2015 | Nathan et al. |
| 2015/0331517 A1 | 11/2015 | Filiz et al. |
| 2016/0306481 A1* | 10/2016 | Filiz ....................... G06F 3/0414 |
| 2016/0320911 A1* | 11/2016 | Crandall ................ G06F 3/0418 |
| 2016/0357331 A1* | 12/2016 | Kano ....................... G06F 3/044 |
| 2017/0371475 A1* | 12/2017 | Cheng .................... G06F 3/0416 |
| 2018/0004320 A1* | 1/2018 | Polishchuk ............. G06F 3/044 |
| 2018/0113343 A1* | 4/2018 | Huang .............. G02F 1/133308 |

FOREIGN PATENT DOCUMENTS

| | | |
|---|---|---|
| WO | WO-2015066086 A1 | 5/2015 |
| WO | WO-2016102975 A2 | 6/2016 |

\* cited by examiner

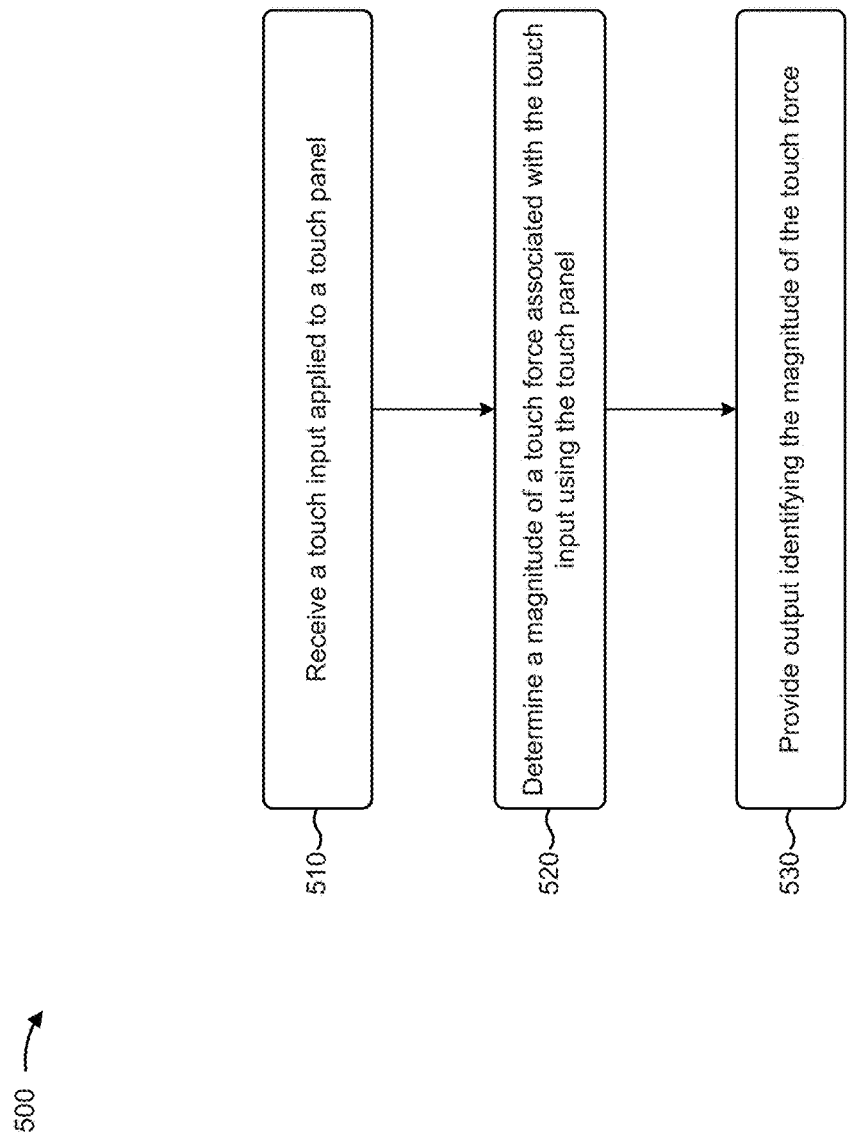

APPARATUS FOR PIEZOELECTRIC FORCE DETECTION

FIELD OF THE DISCLOSURE

Aspects of the present disclosure generally relate to a touch panel apparatus, and more particularly to an apparatus for piezoelectric force detection.

BACKGROUND

A display may be utilized to present information to a user. For example, a particular device, such as a mobile device, a user device, a user equipment (UE), or the like, may include a display to provide information, such as via a user interface. The display may be utilized as an input device. For example, the particular device may utilize a capacitive touch panel or a resistive touch panel to identify a location of a touch input (i.e., a touch location), and may determine an input to the particular device based at least in part on the location of the touch input.

SUMMARY

In some aspects, a touch panel may include a cover layer, of a plurality of layers, to receive a touch force applied to the touch panel. The touch panel may include a force determination set of layers, of the plurality of layers, configured to determine a magnitude of the touch force applied to the touch panel. The force determination set of layers may include a piezoelectric layer with a set of force determination pixels. The set of force determination pixels may be arranged in a matrix, with a set of rows and a set of columns, to address the set of force determination pixels. A force determination pixel, of the set of force determination pixels, may be configured to generate a charge for determining a location, relative to the set of rows and the set of columns, of the touch force applied to the touch panel and a magnitude of the touch force applied to the touch panel.

In some aspects, a device may include a cover layer, of a plurality of layers, to receive a touch force applied to the device. The device may include a force determination set of layers, of the plurality of layers, configured to determine a magnitude of the touch force applied to the device. The force determination set of layers may be disposed between the cover layer and a display of the device. The force determination set of layers may include a piezoelectric layer with a set of force determination pixels. The set of force determination pixels may be arranged in a matrix, with a set of rows and a set of columns, to address the set of force determination pixels. A force determination pixel, of the set of force determination pixels, may be configured to generate a charge for determining a location, relative to the set of rows and the set of columns, of the touch force applied to the device and a magnitude of the touch force applied to the device.

In some aspects, an apparatus may include a cover layer, of a plurality of layers, to receive a touch force applied to the apparatus. The apparatus may include a force determination set of layers, of the plurality of layers, configured to determine a magnitude of the touch force applied to the apparatus. A display of the apparatus may be disposed between the force determination set of layers and the cover layer. The force determination set of layers may include a piezoelectric layer with a set of force determination pixels. The set of force determination pixels may be arranged in a matrix, with a set of rows and a set of columns, to address the set of force determination pixels. A force determination pixel, of the set of force determination pixels, may be configured to generate a charge for determining a location, relative to the set of rows and the set of columns, of the touch force applied to the apparatus and a magnitude of the touch force applied to the apparatus.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process for piezoelectric force determination using a touch panel, in accordance with various aspects of the present disclosure.

DETAILED DESCRIPTION

Figure 1A:
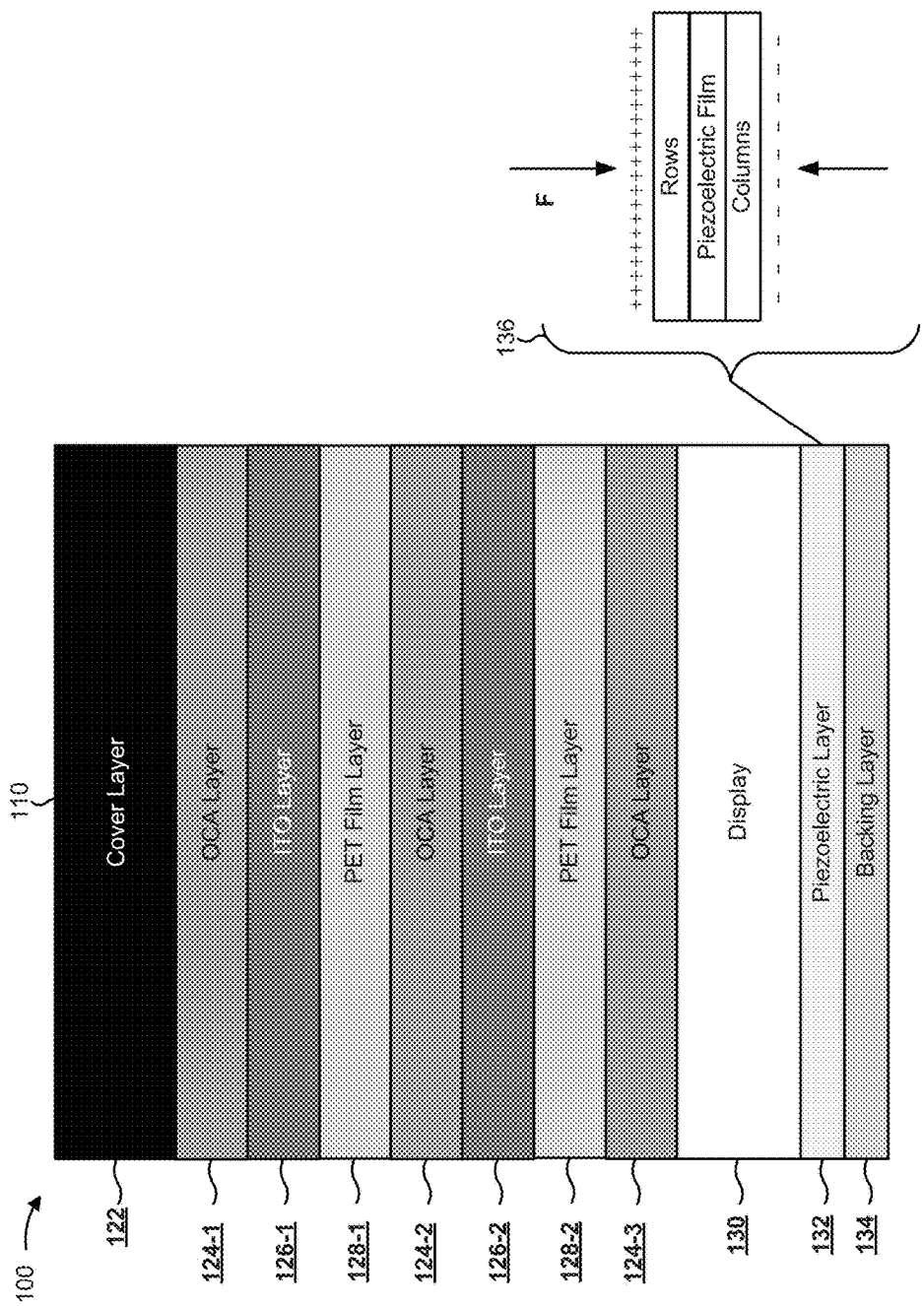
FIGS. 1A and 1B are diagrams illustrating an example of a touch panel to perform piezoelectric force determination, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

Many devices, such as mobile devices (e.g., smart phones), may include a touch panel display. These touch panel displays provide information using a first set of layers associated with a display and receive touch input using a second set of layers associated with determining a location of a touch input (i.e., a touch location). The second set of layers may perform capacitive touch based touch location determination. For example, a device may detect a change to an electrostatic field of a particular layer based at least in part on a touch input, and may determine a touch location based at least in part on the change to the electrostatic field. Similarly, the device may perform resistive touch based touch location determination. For example, the device may detect a change to a voltage associated with a set of layers based at least in part on a deflection of the set of layers by the touch input, and may determine the touch location based at least in part on the change to the voltage. The device may determine a magnitude of a force associated with the touch. For example, based at least in part on a deflection of a layer (e.g., a deformation of a glass surface of the device), the device may determine a magnitude of the touch force.

However, determining a magnitude of a force based at least in part on a deflection of a layer may provide relatively poor sensitivity to touch force. Moreover, sensitivity to touch force may be variable based at least in part on a touch location. In other words, a sensitivity to touch force at a center of the touch panel may be different from a sensitivity to touch force at an edge of the touch panel. This may result in the device performing complex calculations to account for differing sensitivities to touch force, which may reduce battery life of the device and may result in excessive utilization of processing resources. Moreover, each device may require a calibration step before force determination may be performed using a deflection based technique. Furthermore, capacitive touch-based systems may be associated with excessive cost, which may make capacitive touch-based systems infeasible for inclusion in some devices.

In aspects, described herein, a touch panel may utilize a piezoelectric film with matrix-addressed, force determination pixels configured to determine a magnitude of a touch force. In this way, a device may include the touch panel to provide variable user input based at least in part on the magnitude of the touch force and display of information using a display of the touch panel. Moreover, based at least in part on utilizing piezoelectric film, the device may be associated with a reduced cost, a reduced utilization of processing resources, and an improved battery life relative to another technique for determination of a magnitude of a touch force (e.g., a capacitive touch-based system). Furthermore, based at least in part on utilizing the matrix-addressed, force determination pixels of the piezoelectric film, the piezoelectric film may include a reduced quantity of circuits, thereby reducing cost, manufacturing complexity, and power requirements, relative to another piezoelectric-based technique.

Figure 1B:
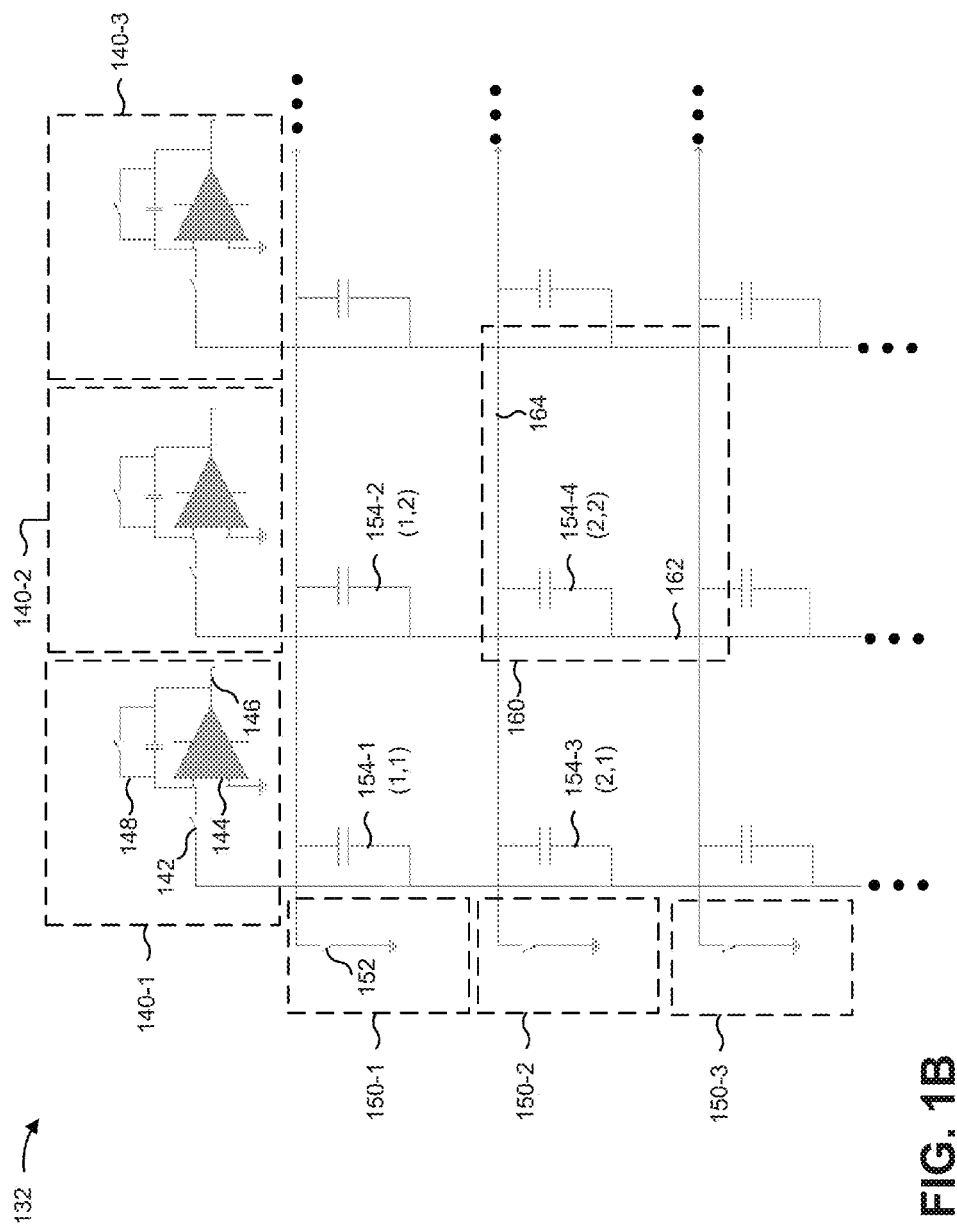

FIGS. 1A and 1B are diagrams illustrating an example 100 of a touch panel to perform piezoelectric force determination, in accordance with various aspects of the present disclosure.

As shown in FIG. 1A, an example touch panel 110 includes a cover layer 122, a set of optically clear adhesive (OCA) layers 124-1 through 124-3, a set of indium-tin-oxide (ITO) layers 126-1 through 126-2, a set of polyethylene terephthalate (PET) film layers 128-1 through 128-2, a display 130, a piezoelectric layer 132, and a backing layer 134.

Cover layer 122 includes one or more transparent layers to receive a touch input, such as a particular touch force (F) with a particular magnitude at a particular touch location. For example, cover layer 122 may include a transparent glass layer, a transparent plastic layer, a transparent crystal layer, or the like. In some aspects, cover layer 122 may include a lens layer. In some aspects, cover layer 122 may include an anti-scratch layer, an anti-glare layer, an anti-reflective layer, or the like. In some aspects, cover layer 122 may be associated with an electrostatic field that is distorted when cover layer 122 receives a touch input, such that the distortion is detectable using touch panel 110. For example, off panel circuitry of a device including touch panel 110 may receive an electrical signal indicating the distortion, and may determine a touch location based at least in part on the electrical signal.

OCA layers 124 include a set of transparent layers to adhere other sets of layers. For example, OCA layer 124-1 may adhere cover layer 122 to ITO layer 126-1, OCA layer 124-2 may adhere PET film layer 128-1 to ITO layer 126-2, and OCA layer 124-3 may adhere PET film layer 128-2 to display 130. In some aspects, OCA layer 124 may include a liquid OCA layer, a solid OCA layer (e.g., an OCA tape layer), or the like. For example, during manufacture of touch panel 110, a set of OCA layers 124 may be deposited to touch panel 110 to permit deposition of subsequent layers to touch panel 110.

ITO layers 126 include a set of conductive, transparent layers to permit capacitive detection of a force location. For example, when cover layer 122 receives a touch input, a distortion of an electrostatic field by the touch input is measurable by a change of capacitance. Off panel circuitry of a device including touch panel 110 may receive an electrical signal from ITO layers 126 based at least in part on the distortion of the electrostatic field, and may determine a touch location of the touch input. In another example, ITO layers 126 may utilize another technique for determining a location of a touch force, such as a resistive touch based technique, a relative magnitude of touch forces based technique, or the like.

PET film layers 128 include a set of transparent layers backing ITO layers 126. For example, PET film layer 128-1 may form a backing for ITO layer 126-1 and PET film layer 128-2 may form a backing layer for ITO layer 126-2. In some aspects, ITO layers 126 may be sputter deposited onto PET film layers 128. In some aspects, PET film layers 128 may include a metal mesh or a set of circuits to direct an electrical signal for capacitive sensing of a touch location toward off panel circuitry to permit the off panel circuitry configured to determine the touch location of the touch input.

Display 130 includes a display to provide information. For example, display 130 may include a light-emitting diode (LED) based display, a liquid crystal display (LCD) based display, or the like. In another example, touch panel 110 may integrate piezoelectric layer 132 into a portion of display 130, such as in a back-lighting portion of display 130 where an opaque characteristic of piezoelectric layer 132 does not obscure display 130 to a viewer of display 130 through cover layer 122.

Piezoelectric layer 132 includes a piezoelectric film configured to determine a magnitude of a touch force when a touch input is received by cover layer 122. For example, piezoelectric layer 132 may include a piezoelectric film adhered to backing layer 134. As shown by reference number 136, the piezoelectric film may include multiple layers (e.g., Rows and Columns) to form a matrix of force determination pixels that are associated with force-sensitive capacitors. Details of the multiple layers are described in more detail with regard to FIG. 1B.

In some aspects, piezoelectric layer 132 may be patterned into multiple force determination pixels, which are matrix addressed into rows and columns and which are electrically coupled to circuitry associated with determining a magnitude of a touch force. For example, piezoelectric layer 132 may include a metallization to direct electrical signals (e.g., electrical charge) via piezoelectric layer 132 to off panel circuitry to process the electrical signals. In this case, the off panel circuitry may receive the electrical signals and utilize the electrical signals to determine a magnitude of a touch force. Additionally, or alternatively, based at least in part on comparing a relative magnitude of a touch force at multiple force determination pixels, the off panel circuitry may determine a location of a touch input (e.g., based at least in part on identifying a particular force determination pixel registering a greatest amount of force relative to other force determination pixels).

In some aspects, piezoelectric layer 132 may include an opaque layer. For example, piezoelectric layer 132 may include a set of copper layers sandwiching a piezoelectric film, which is constructed from polyvinylidene fluoride (PVDF), PET, or the like. In this case, based at least in part on positioning piezoelectric layer 132 between display 130 and backing layer 134 (e.g., in contrast to being positioned between display 130 and cover layer 122 as described herein with regard to FIGS. 2A-2D), piezoelectric layer 132 avoids obscuring display 130.

Backing layer 134 includes a rigid backing layer to reduce a deflection of the touch panel based at least in part on a touch input. For example, based at least in part on a device using touch panel 110 to determine a magnitude of a touch force using a piezoelectric based technique rather than a deflection based technique, backing layer 134 may be included in touch panel 110 to ensure that touch panel 110 is not deflected by a threshold amount by the touch input, thereby improving durability of touch panel 110 relative to another touch panel that is required to be deflected to determine the magnitude of a touch force. In some aspects, backing layer 134 may ensure that force sensitivity is more uniform across touch panel 110 relative to a deflection based force determination technique.

As shown in FIG. 1B, piezoelectric layer 132 may include a set of circuits based at least in part on metallization of a piezoelectric film layer or of a set of layers sandwiching the piezoelectric film layer. For example, piezoelectric layer 132 includes a set of force determination column circuits 140, which include a column switch 142, an amplifier 144, an output 146, and a reset/charge-integrating circuit 148; a set of force determination row circuits 150, which include a row switch 152; and a set of capacitors 154. In some aspects, piezoelectric layer 132 may be electrically coupled to off panel circuitry, such as a controller to actuate switches 142 and 152 and a switch of reset/charge-integrating circuit 148. For example, the controller may activate (e.g., close) and deactivate (e.g., open) switches 142 and 152, and may activate (e.g., close and subsequently open) reset/charge-integrating circuit 148. Additionally, or alternatively, the controller may perform a readout of an electrical signal from output 146 that provides an indication of a magnitude of a touch force.

In some aspects, when switch 152 is open, a threshold quantity of charge may flow between a ground and a column. In this case, the controller may determine a differential value between a charge flow when switch 152 is open and a charge flow when switch 152 is closed to perform force readout. For example, the controller may perform a first force readout (e.g., of output 146) of the charge of a force determination pixel as a calibration step (e.g., prior to actuating switch 152) to determine a charge leakage, and may perform a second force readout as a force determination step (e.g., after actuating switch 152) to determine a magnitude of a touch force.

In some aspects, the controller may perform force readout without using switches 142 and 152 (e.g., for a piezoelectric layer 132 that does not include switches 142 and 152 that does not perform both force determination and force location determination). For example, the controller may utilize a set of short circuits of a metallization of piezoelectric layer 132 to perform force readout.

Although referred to, herein, as off panel circuitry, a controller and/or other circuitry described herein may be included in a touch panel, such as touch panel 110.

As shown with regard to FIGS. 1A and 1B, piezoelectric layer 132 may include a first layer and a second layer, each patterned onto a piezoelectric film. For example, and as shown in FIG. 1B, the first layer may include circuitry associated with force determination column circuits 140 and the second layer may include circuitry associated with force determination row circuits 150. In this case, metallization of columns and rows may form a set of sections (i.e., force determination pixels), such as section 160, which are matrix addressed by the columns and rows corresponding to the force determination column circuits 140 and the force determination row circuits 150. In other words, force determination column circuit 140-2 and force determination row circuit 150-2 may connect to a first section (e.g., addressed (2,2) in FIG. 1B and corresponding to capacitor 154-4) via, respectively, a column signal lead 162 and a row signal lead 164. Signal leads 162 and 164 may refer to metallizations of the respective first and second layers. In this case, capacitor 154-4 may be a parallel plate capacitor extending from signal lead 164 at the first layer to signal lead 162 at the second layer and may be charged by the piezoelectric film when a touch input is received.

In this way, a device may utilize touch panel 110, which provides a set of layers associated with performing capacitive force location (e.g., ITO layers 126) and a set of layers associated with performing force determination (e.g., piezoelectric layer 132) to determine a touch location and a magnitude of a touch force. In another example, touch panel 110 may omit layers of touch panel 110 associated with determining the touch location (e.g., for a device that is to receive input based at least in part on a touch force without determining a touch location or for a device that is to determine a touch location based at least in part on comparing relative magnitudes of the touch force at multiple force determination pixels). Based at least in part on using matrix addressed rows and columns of piezoelectric layer 132, touch panel 110 includes a reduced quantity of signal leads to connect to the force-sensitive capacitors relative to another touch panel that utilizes dedicated circuitry for each force-sensitive capacitor.

As indicated above, FIGS. 1A and 1B are provided as examples. Other examples are possible and may differ from what was described above in connection with FIGS. 1A and 1B.

FIGS. 2A-2D are diagrams illustrating an example 200 of a touch panel to perform piezoelectric force determination, in accordance with various aspects of the present disclosure.

Figure 2A:
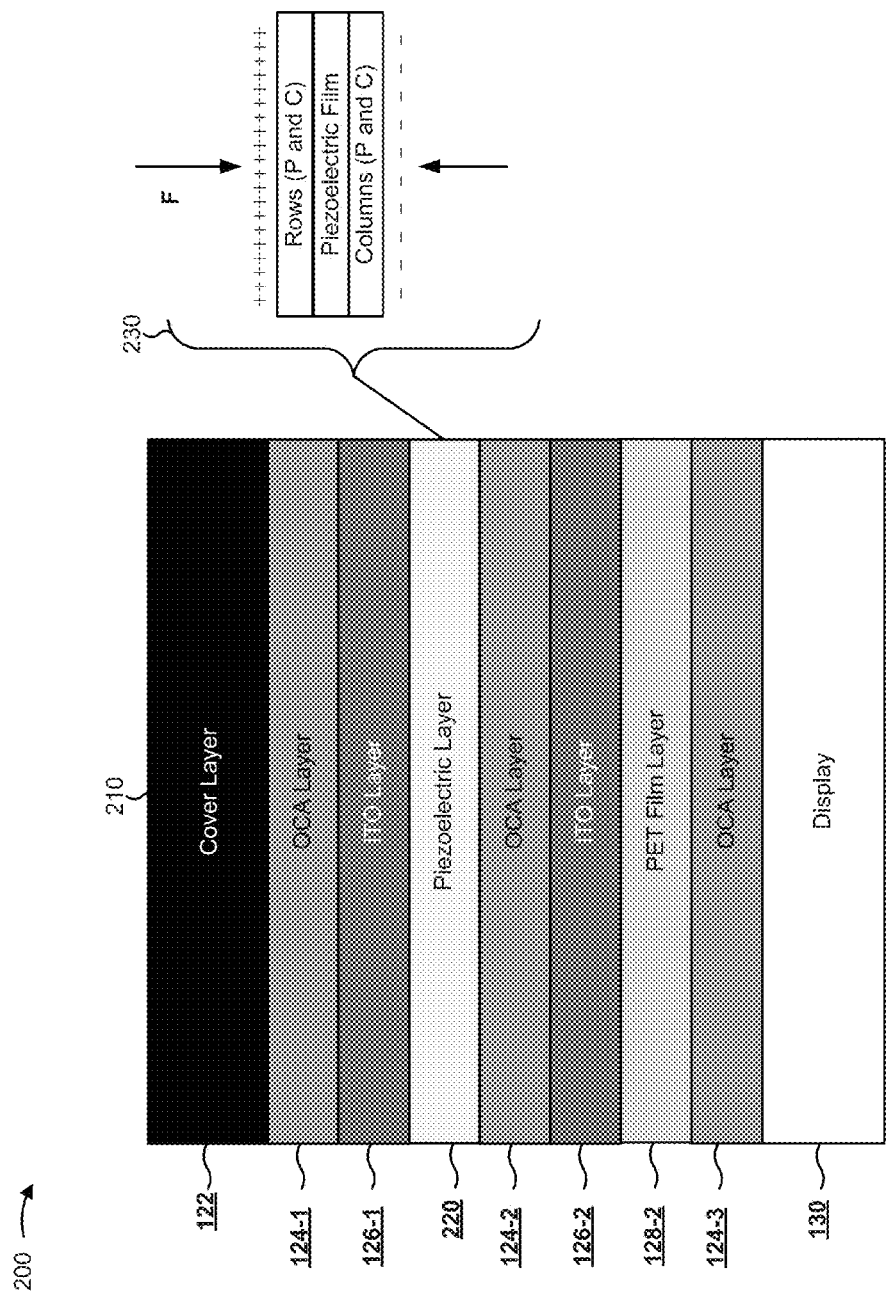
FIGS. 2A-2D are diagrams illustrating another example of a touch panel to perform piezoelectric force determination, in accordance with various aspects of the present disclosure.

As shown in FIG. 2A, an example touch panel 210 includes a cover layer 122, a set of optically clear adhesive (OCA) layers 124-1 through 124-3, a set of indium-tin-oxide (ITO) layers 126-1 through 126-2, a polyethylene terephthalate (PET) film layer 128, a display 130, and a piezoelectric layer 220. In some aspects, piezoelectric layer 220 corresponds to piezoelectric layer 132.

As further shown in FIG. 2A, piezoelectric layer 220 is positioned between ITO layers 126-1 and 126-2. As shown by reference number 230, both piezoelectric circuitry (P) and capacitive circuitry (C) are patterned onto piezoelectric layer 220, thereby permitting piezoelectric layer 220 to be used to determine both a touch location and a magnitude of a touch force. In this way, a device including touch panel 210 may utilize a common set of layers to determine a touch location and a magnitude of a touch force, thereby reducing a size and a cost of touch panel 210 and/or devices including touch panel 210 relative to another type of touch panel that requires multiple separate sets of layers to perform a determination of a touch location and a magnitude of a touch force.

In some aspects, piezoelectric layer 220 may include a PVDF based layer, a PVDF on PET based layer, or the like, which may permit piezoelectric layer 220 to include circuitry for both piezoelectric force determination and capacitive touch location determination. In some aspects, piezoelectric layer 220 may be a transparent layer. For example, piezoelectric layer 220 may include a transparent material to permit piezoelectric layer 220 to be positioned between cover layer 122 and display 130 without obscuring display 130. In this case, a firm backing layer may be integrated into display 130, thereby reducing a size and a cost of touch panel 210 relative to another type of touch panel that requires a separate firm backing layer to back a piezoelectric layer.

Figure 2B:
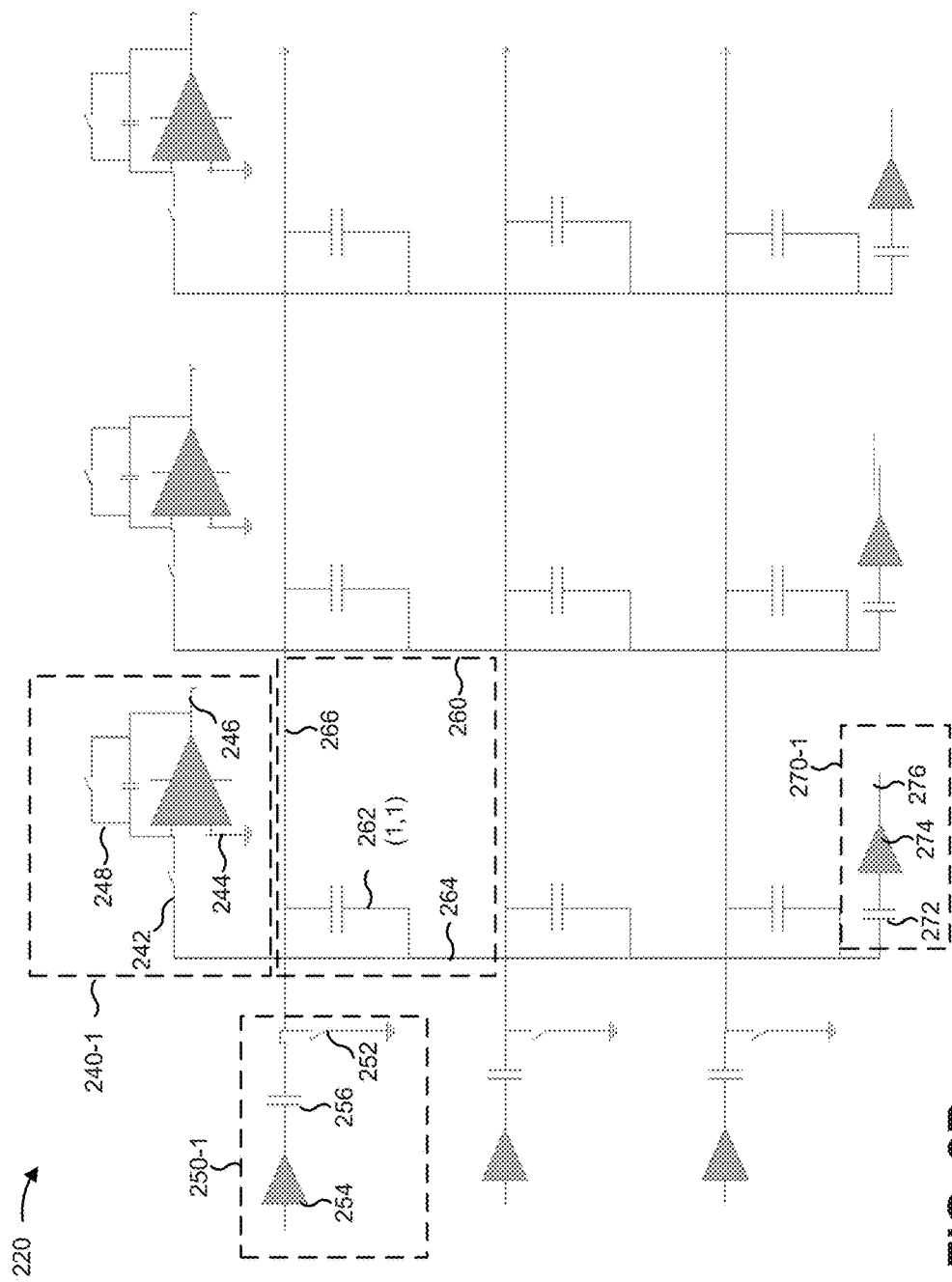

As shown in FIG. 2B, piezoelectric layer 220 may include a set of circuits based at least in part on metallization of a piezoelectric film layer (e.g., a metallization layer on the piezoelectric film layer). For example, piezoelectric layer 220 includes a set of force determination column circuits 240, which include a column switch 242, an amplifier 244, an output 246, and a reset circuit 248; a set of force determination/force location row circuits 250, which include a row switch 252, an amplifier 254, and a capacitor 256; a set of sections 260 (i.e., force determination pixels) formed by the metallization, which include a capacitor 262, a column signal lead 264, and a row signal lead 266; and a set of force location column circuits 270, which include a capacitor 272, an amplifier 274, and an output 276. In some aspects, piezoelectric layer 220 may be electrically coupled to off panel circuitry, such as a controller or the like.

As further shown in FIG. 2B, piezoelectric layer 220 provides a piezoelectric based force determination functionality via force determination column circuits 240, force determination/force location row circuits 250, and sections 260. Similarly, piezoelectric layer 220 provides a capacitive touch based force location functionality via force determination/force location row circuits 250, sections 260, and force location column circuits 270.

As further shown in FIG. 2B, capacitors 256 are positioned in series with row signal leads 266 and capacitors 272 are positioned in series with column signal leads 264. Capacitors 256 and 272 reduce leakage of force-generated charge from capacitors 262 into amplifiers 254 and 274, respectively. In some aspects, amplifiers 254 and 274 may include low-noise operational amplifiers (LNAs) to transmit electrical signals for capacitive touch determination of a touch location. Capacitors 256 and 272 may have a capacitance of between approximately 1 nanofarad and approximately 1 microfarad and are to block charge leakage without causing excess series impedance for electrical signals associated with a determination of a touch location. Touch transmit waveforms associated with determination of a touch location may be provided at approximately 100 kilohertz (kHz).

In another example, an inductor and a series switch may be integrated into piezoelectric layer 220 to provide an inductance of approximately 10 millihenry (mH) to block 100 KHz electrical signals associated with determination of a touch location with an approximately 10 kilo-ohm (kOhm) impedance and only an approximately 1 ohm impedance to baseband (e.g., less than approximately 10 Hz) electrical signals associated with determination of a magnitude of a touch force. Based at least in part on using a first range of signal frequencies (e.g., approximately 100 KHz) to determine a location of a touch force and a second range of signal frequencies (e.g., baseband) associated with determination of the magnitude of the touch force, touch panel 210 may be utilized to perform concurrent touch location determination and touch force determination.

In another example, one or more amplifiers, inductors, or the like may be omitted from touch panel 210 when the controller is configured to disable determination of a touch location during force determination of a magnitude of a touch force. In this case, switches 242 and 252 may remain open when a determination of a touch location is to be performed, and determination of a touch location is suspended (e.g., by disabling an electrical signal associated with determination of a touch location), when a determination of a magnitude of a touch force is to be performed.

In this way, a device may utilize touch panel 210, which provides a single set of layers associated with performing a capacitive technique for determining a touch location and a piezoelectric technique for determining a magnitude of a touch force. Based at least in part on integrating circuitry for both the capacitive technique and the piezoelectric technique into a common set of layers, touch panel 210 is associated with a reduced cost and a reduced size relative to another type of touch panel that requires separate sets of layers for a determination of a touch location and a determination of a magnitude of a touch force.

Figure 2C:
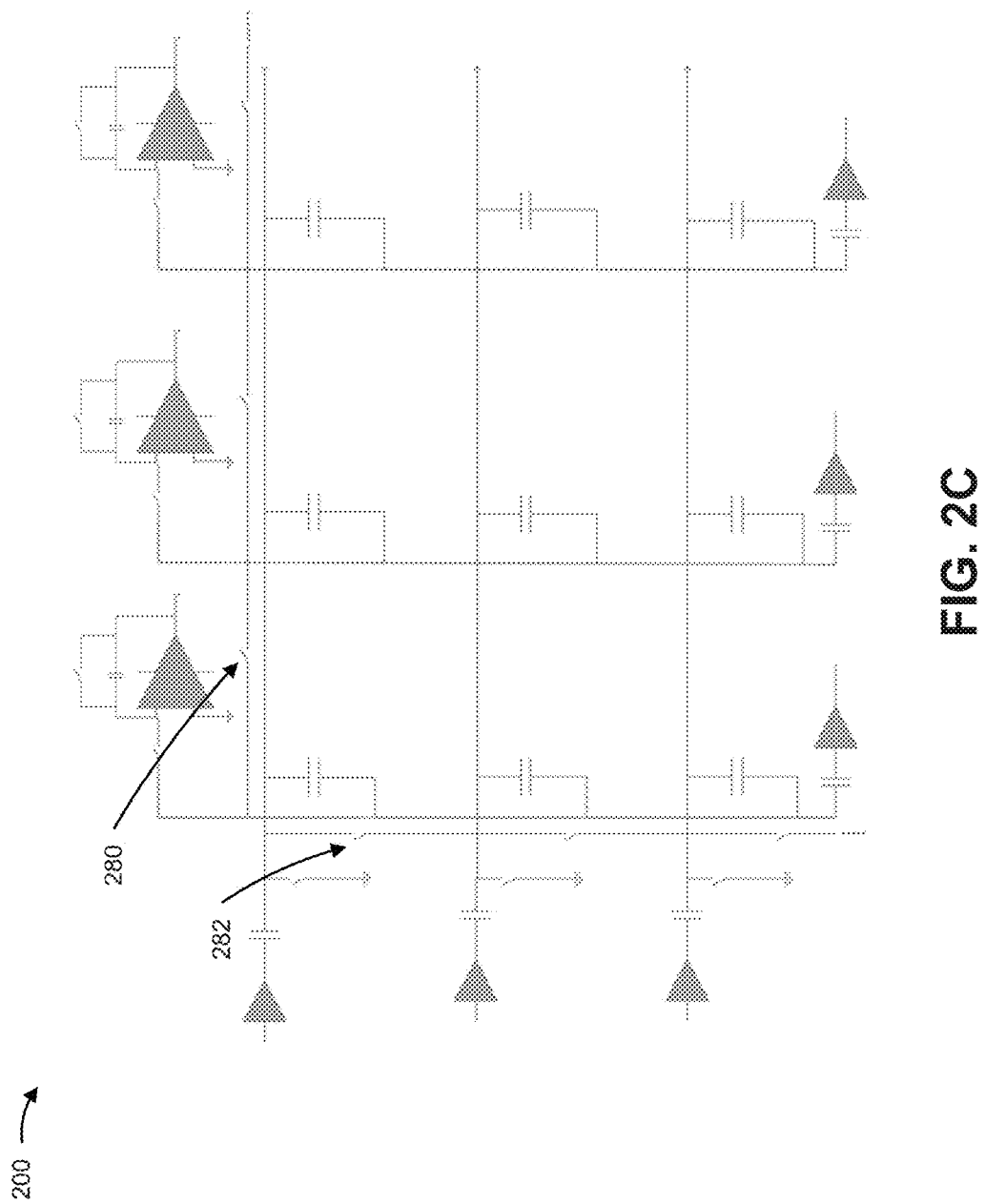

As shown in FIG. 2C, and by reference numbers 280 and 282, a similar piezoelectric layer 220 may include a set of switches to combine multiple force determination pixels into a single force determination pixel (or multiple single force determination pixels) to permit force detection using larger sized force detection pixels relative to force detection pixels shown in FIG. 2B. In this case, the set of switches may permit the multiple force determination pixels to remain uncombined when performing touch location determination. In this way, sensitivity to force magnitude is improved relative to utilizing reduced sized force detection pixels. In another example, another arrangement of a set of switches may be used to form force detection pixels of different sizes in the same touch panel 210, such as larger force detection pixels at an edge relative to a center of touch panel 210 to improve force detection.

Figure 2D:
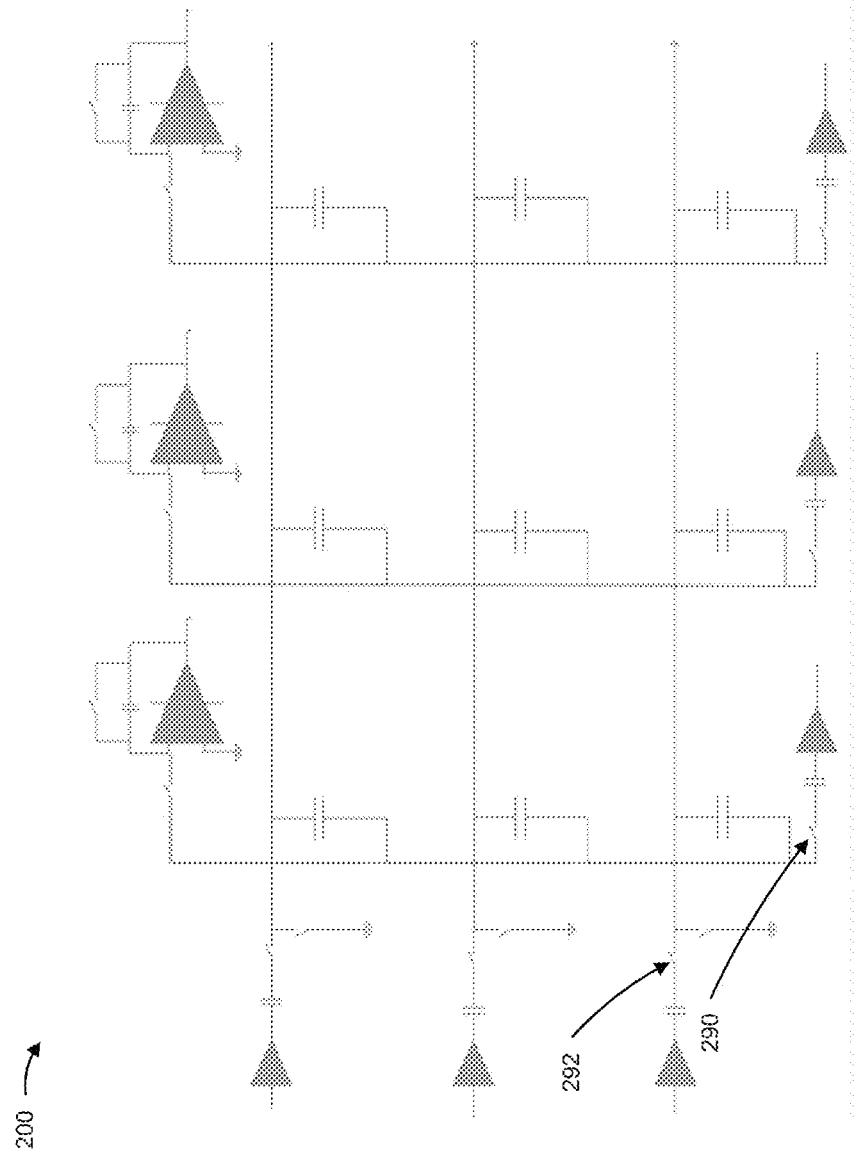

As shown in FIG. 2D, and by reference numbers 290 and 292, another similar piezoelectric layer 220 may include a set of switches to isolate touch transmitter amplifiers and touch receive amplifiers from the piezoelectric force elements when a device including the touch panel is not in a touch mode, thereby reducing a utilization of energy resources.

As indicated above, FIGS. 2A-2D are provided as examples. Other examples are possible and may differ from what was described above in connection with FIGS. 2A-2D.

Figure 3:
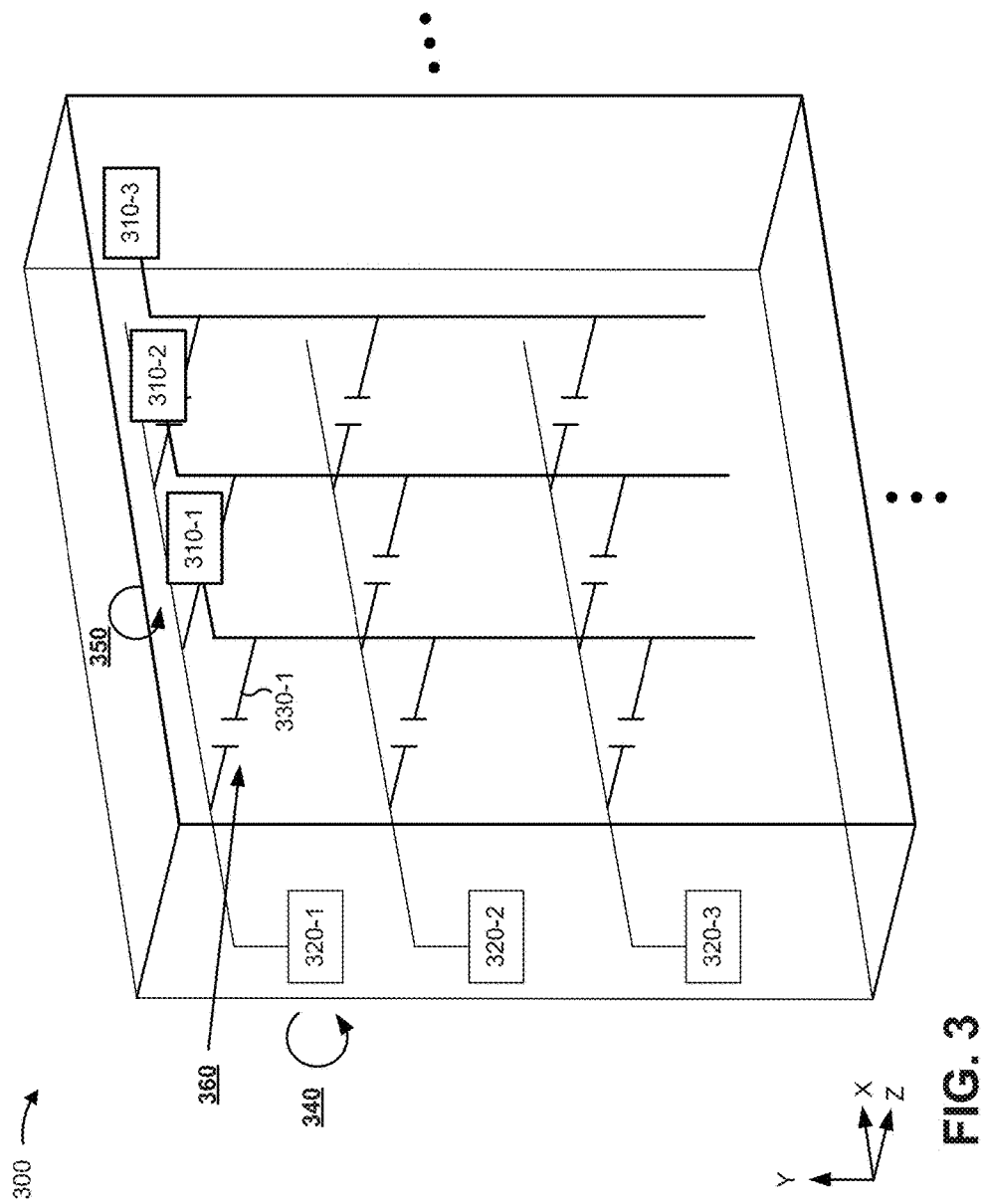
FIG. 3 is a diagram illustrating an example of operation of a touch panel to perform piezoelectric force determination, in accordance with various aspects of the present disclosure.

FIG. 3 is a diagram illustrating an example 300 of operation of a touch panel to perform piezoelectric force determination, in accordance with various aspects of the present disclosure. As shown in FIG. 3, example 300 includes a piezoelectric layer of a touch panel, such as touch panel 110, with a set of force determination column circuits 310, a set of force determination row circuits 320, and a set of capacitors 330. When a touch is received by the touch panel, piezoelectric charge is generated by a piezoelectric film of a piezoelectric layer of the touch panel, and stored by a capacitor 330-1 associated with a force determination pixel. A controller may select a row, of a set of rows of the piezoelectric layer, and may activate a switch of the row. For example, as indicated by reference number 340, the controller may cause a switch of force determination row circuit 320-1 to be closed. Similarly, the controller may select a column, of a set of columns of the piezoelectric layer, and may activate a switch of the column. For example, as indicated by reference number 350, the controller may cause a switch of force determination column circuit 310-1 to be closed.

In this case, the piezoelectric charge may flow to cause a piezoelectric force determination for a force determination pixel of the piezoelectric layer to be performed. For example, the piezoelectric charge may flow to a feedback capacitor of a transimpedance amplifier of force determination column circuit 310-1, such as amplifier 144 shown in FIG. 1B, to cause a voltage output of the transimpedance amplifier to be proportional to the piezoelectric charge. The voltage output may be provided to the controller by force determination column circuit 310-1, such as by output 146 shown in FIG. 1B.

Subsequently, the controller may deactivate the switch of force determination column circuit 310-1, select another column, and activate another switch of the other column, such as a column associated with force determination column circuit 310-2, to determine a force associated with another force determination pixel of the piezoelectric layer. After determining the force for each force determination pixel of the row of the piezoelectric layer, the controller may deactivate force determination row circuit 320-1, select another row, such as a row associated with force determination row circuit 320-2, and may determine a force associated with each force determination pixel of the other row by selecting the columns for activation. In another example, the controller may select multiple force determination pixels concurrently, such as by activating a row switch and all of the column switches to determine a force associated with a row for force determination pixels. Similarly, the controller may activate a column switch and all of the row switches. In this way, the touch panel enables a force determination to be performed with multiple levels of granularity and rapidity.

As indicated above, FIG. 3 is provided as an example. Other examples are possible and may differ from what was described above in connection with FIG. 3.

Figure 4:
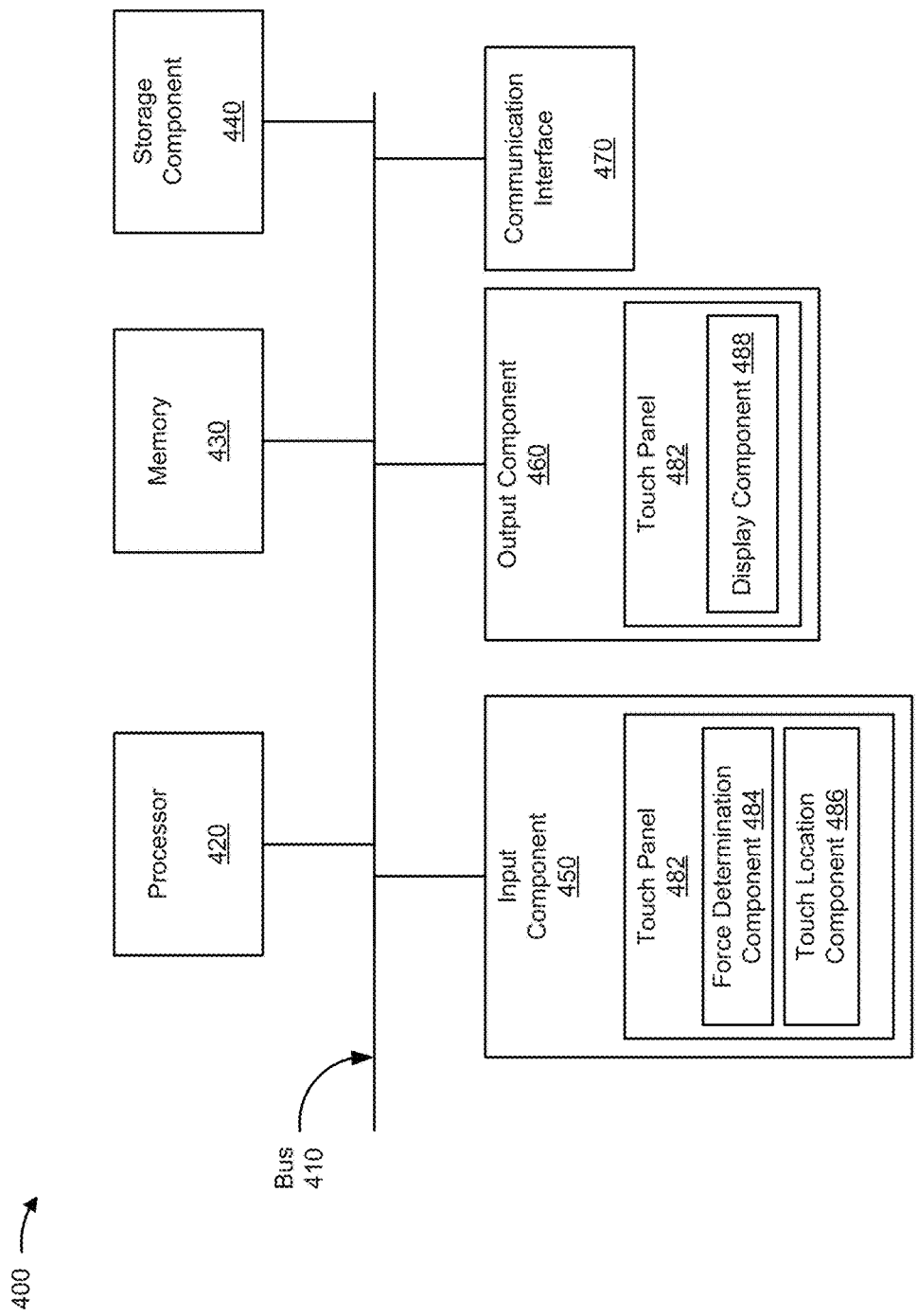
FIG. 4 is a diagram illustrating example components of one or more devices that may include a touch panel described herein, in accordance with various aspects of the present disclosure.

FIG. 4 is a diagram of example components of a device 400, in accordance with various aspects of the present disclosure. Device 400 may correspond to a display device, described herein, such as a digital or analog display that is capable of presenting video content. In some aspects, the display device may include display technologies, such as display technologies used by liquid crystal displays (LCDs), light-emitting diode (LED) displays, plasma displays, or the like. Examples of display devices may include a television, a computer monitor, a smart phone, a user equipment (UE), a laptop computer, a tablet computer, a handheld computer, a gaming device, an interactive whiteboard, and/or another type of device capable of presenting video content.

In some aspects, a display device described herein may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some aspects, processor 420 includes one or more processors capable of being programmed to perform a function. For example, processor 420 may include one or more processors capable of receiving an electrical signal from input component 450 and determining a touch location or a magnitude of a touch force based at least in part on the electrical signal. In some aspects, processor 420 may include a controller (e.g., of a touch panel). Additionally, or alternatively, processor 420 may include one or more processors capable of controlling electrical circuitry of an input component 450. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator).

In some aspects, input component 450 includes a touch panel 482 of a touch screen display. Touch panel 482 includes a force determination component 484 and/or a touch location component 486. In some aspects, touch panel 482 corresponds to touch panel 110 shown in FIGS. 1A and 1B, touch panel 210 shown in FIGS. 2A-2D, or the touch panel shown in FIG. 3. Force determination component 484 includes a set of layers of touch panel 482 to generate an electrical signal based at least in part on a magnitude of a touch force applied to the touch screen display, and provide the electrical signal (e.g., for processing by processor 420 to determine the magnitude of the touch force applied to the touch screen display). Touch location component 486 includes a set of layers of touch panel 482 to generate an electrical signal based at least in part on a touch location of a touch input to the touch screen display, and provide the electrical signal (e.g., for processing by processor 420 to determine the touch location of the touch input to the display device). Although processor 420 and touch panel 482 are described herein as being separate components, in some aspects, touch panel 482 may include processor 420 to determine a touch location or a magnitude of a touch force.

Output component 460 includes a component that provides output information from device 400 (e.g., a display, a speaker, and/or one or more light-emitting diodes (LEDs)). In some aspects, output component 460 includes touch panel 482. Touch panel 482 includes a display component 488, such as a display corresponding to display 130 shown in FIGS. 1A-1B and 2A-2B.

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a diagram illustrating an example process 500 for piezoelectric force determination using a touch panel, in accordance with various aspects of the present disclosure. In some aspects, one or more process blocks of FIG. 5 may be performed by device 400. In some aspects, one or more process blocks of FIG. 5 may be performed by another device or a group of devices separate from or including device 400.

As shown in FIG. 5, in some aspects, process 500 may include receiving a touch input applied to a touch panel (block 510). For example, device 400 may receive the touch input applied to the touch panel. In some aspects, device 400 may receive a particular touch input at a particular section of the touch panel. For example, based at least in part on providing a button at a particular location in a user interface, device 400 may receive a touch input associated with interacting with the button. In this case, device 400 may generate a piezoelectric charge in proportion to a magnitude of a touch force associated with the touch input at a force determination pixel corresponding to the particular section of the touch panel. In some aspects, the piezoelectric charge may be stored via a capacitor associated with a piezoelectric layer of the touch panel.

In some aspects, device 400 may receive multiple touch inputs at multiple sections of the touch panel. For example, device 400 may receive multiple touch inputs at multiple sections of the touch panel, such as to cause a multi-touch gesture, to interact with multiple user interface elements (e.g., multiple buttons), or the like. In this case, device 400 may generate piezoelectric charge at multiple force determination pixels corresponding to the multiple sections of the touch panel and in proportion to a magnitude of a touch force for each of the multiple touch inputs.

As shown in FIG. 5, in some aspects, process 500 may include determining a magnitude of a touch force associated with the touch input using the touch panel (block 520). For example, device 400 may determine the magnitude of the touch force associated with the touch input using the touch panel. In some aspects, device 400 may activate a set of switches of circuitry of the touch panel to read out an electrical charge associated with a set of force determination pixels. For example, device 400 may activate (e.g., close) a row switch and a column switch to cause an electrical charge associated with a capacitor of a force determination pixel addressed by the row switch and the column switch to discharge. In this case, device 400 may determine the magnitude of the touch force based at least in part on the amount of electrical charge that is discharged.

In some aspects, device 400 may read out a set of force determination pixels to determine the magnitude of the touch force. For example, device 400 may activate a first row switch, and may activate and deactivate (e.g., open) each column switch sequentially to cause a discharge of each capacitor of each force determination pixel corresponding to the first row switch. In this case, device 400 may sequentially determine the magnitude of the touch force for each force determination pixel corresponding to the first row switch. Similarly, device 400 may, after activating each column switch for the first row switch, deactivate the first row switch, select a second row switch, and sequentially activate and deactivate each column switch for the second row switch. Similarly, device 400 may activate a column switch, and may cycle through multiple row switches, sequentially. In this way, device 400 determines a magnitude of a touch force for each force determination pixel of the touch panel.

In some aspects, device 400 may read out multiple force determination pixels concurrently to determine the magnitude of the touch force. For example, device 400 may activate a row switch and multiple column switches (or a column switch and multiple row switches) to determine a magnitude of a touch force based at least in part on piezoelectric charge generated by multiple force determination pixels associated with a row (or column). In this way, device 400 may reduce an amount of time to determine a magnitude of a touch force and/or may permit determination of a magnitude of a touch force for a touch input that is expected to be larger than an area of a single force determination pixel.

In some aspects, device 400 may read out a particular force determination pixel. For example, when device 400 expects to receive a touch input to a particular location of the touch panel (e.g., a button provided via a user interface), device 400 may activate a row switch and a column switch corresponding to the particular location to determine a piezoelectric charge generated by the particular force determination pixel and stored as electrical charge using a capacitor of the particular force determination pixel. In some aspects, device 400 may read out the particular force determination pixel based at least in part on determining a touch location. For example, based at least in part on determining a touch location, such as using a capacitive technique, device 400 may activate a row switch and a column switch corresponding to a force determination pixel at the touch location. In this way, device 400 reduces a utilization of processing resources, a utilization of electrical resources, and a time to determine a magnitude of a touch force relative to attempting to read out all of the force determination pixels.

In some aspects, device 400 may determine the magnitude of the touch force at a particular time. For example, device 400 may utilize a timer to periodically read out a set of force determination pixels. In some aspects, device 400 may utilize the timer to alternate (e.g., separate in the time domain) determination of a touch location and determination of a magnitude of the touch force. Additionally, or alternatively, device 400 may separate determination of the touch location and the magnitude of the touch force in the frequency domain by using multiple frequencies of electrical signals, as described in more detail with regard to FIGS. 2A-2D.

In some aspects, device 400 may determine the magnitude of the touch force based at least in part on multiple touch forces associated with multiple pixels. For example, device 400 may identify a particular force determination pixel associated with a greatest electrical charge relative to the other force determination pixels, and may determine the magnitude of the touch force based at least in part on the electrical charge associated with the particular force determination pixel. Additionally, or alternatively, device 400 may determine multiple magnitudes of multiple touch forces. For example, based at least in part on detecting multiple touch locations using a capacitive technique, device 400 may determine multiple magnitudes of multiple touch forces associated with the multiple touch locations based at least in part on electrical charges associated with force determination pixels corresponding to the multiple touch locations. In some aspects, device 400 may determine a quantity of touch inputs based on a magnitude of the touch force. For example, a first threshold touch force may correspond to a single touch input and a second threshold touch force may correspond to a multi-touch touch input. In this way, device 400 determines a quantity of touches. In some aspects, device 400 may detect a touch input based on a magnitude of a touch force satisfying a threshold. For example, when the magnitude of the touch force is less than the threshold, device 400 may determine that a touch input has not occurred, but when the magnitude of the touch force is greater than the threshold, device 400 may determine that the touch input has occurred.

In some aspects, device 400 may determine the magnitude of the touch force using off panel circuitry. For example, device 400 may include processing circuitry (e.g., a processor) to determine a magnitude of a touch force corresponding to a piezoelectric charge generated by a piezoelectric film of a force determination pixel and stored using a capacitor of the force determination pixel. Based at least in part on the piezoelectric charge being proportional to the touch force and a coefficient of piezoelectricity of the piezoelectric film, device 400 can determine the magnitude of the touch force with a reduced utilization of processing resources relative to calculating the magnitude of the touch force based at least in part on a calibrated deflection based technique. Moreover, device 400 can determine the magnitude of the touch force without requiring a determination of a precise location of the touch force as may be required for the calibrated deflection based technique.

As shown in FIG. 5, in some aspects, process 500 may include providing output identifying the magnitude of the touch force (block 530). For example, device 400 may provide output identifying the magnitude of the touch force. In some aspects, device 400 may provide an indicator of the magnitude of the touch force. For example, device 400 may provide a user interface element that identifies the magnitude of the touch force. Additionally, or alternatively, device 400 may perform a response action associated with the magnitude of the touch force and provide information identifying the response action. For example, when the magnitude of the touch force satisfies a first threshold, device 400 may perform a first action and, when the magnitude of the touch force satisfies a second threshold, device 400 may perform a second action. In some aspects, device 400 may provide information identifying a touch location of the touch input when providing information identifying the magnitude of the touch force. For example, device 400 may provide information indicating that a first touch location is associated with a first magnitude of a first touch force and a second touch location is associated with a second magnitude of a second touch force.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Apparatuses described herein use a touch panel with a matrix addressed piezoelectric layer configured to determine a magnitude of a touch force, which obviates a need for the touch panel to deflect to determine the magnitude of the touch force, thereby reducing a utilization of processing resources, reducing a size and a cost of the touch panel, and improving a durability of the touch panel and/or the apparatus that includes the touch panel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based at least in part on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover: a; b; c; a and b; a and c; b and c; and a, b and c.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A touch panel, comprising:
   a cover layer, of a plurality of layers, to receive a touch force applied to the touch panel;
   a capacitive touch set of layers to determine the location of the touch force; and
   a force determination set of layers, of the plurality of layers, configured to determine a magnitude of the touch force applied to the touch panel,
      the force determination set of layers including:
         a piezoelectric layer with a set of force determination pixels,
            the set of force determination pixels being arranged in a matrix, with a set of rows and a set of columns, to address the set of force determination pixels,
            a force determination pixel, of the set of force determination pixels, to generate a charge for determining the location, relative to the set of rows and the set of columns, of the touch force applied to the touch panel and a magnitude of the touch force applied to the touch panel,
   where the capacitive touch set of layers and the force determination set of layers further comprise:
   a set of first amplifiers capacitively coupled to corresponding rows, of the set of rows, to excite each row with a touch transmit waveform,
   a set of second amplifiers capacitively coupled to corresponding columns, of the set of columns, to read out the touch transmit waveforms,
   a set of switches corresponding to the set of columns to connect a set of third amplifiers to a corresponding column, of the set of columns, during force readout when the touch transmit waveform is not being provided.

2. The touch panel of claim 1, where the force determination set of layers further comprises:
   a set of switches corresponding to the set of rows to determine a row, of the set of rows, corresponding to the location of the touch force,
      the row including one or more force determination pixels of the set of force determination pixels.

3. The touch panel of claim 2, further comprising:
   a controller to actuate the set of switches to determine the location of the touch force.

4. The touch panel of claim 1, where the force determination set of layers further comprises:
   a set of amplifiers with a set of charge-integrating circuits and a set of reset switches to perform a force readout of the set of force determination pixels and to provide an indication of the location of the touch force based at least in part on performing the force readout.

5. The touch panel of claim 1, where a display of the touch panel is disposed between the cover layer and the force determination set of layers.

6. The touch panel of claim 1, where the force determination set of layers is disposed between the cover layer and a display of the touch panel.

7. The touch panel of claim 6, where the force determination set of layers is a transparent set of layers.

8. The touch panel of claim 1, where the capacitive touch set of layers and the force determination set of layers share at least one common layer,
   the touch panel to use a first range of signal frequencies to determine the location of the touch force via the capacitive touch set of layers,
   the touch panel to use a second range of signal frequencies to determine the magnitude of the touch force via the force determination set of layers,
   the first range of signal frequencies and the second range of signal frequencies being mutually exclusive.

9. The touch panel of claim 8, where the second range of signal frequencies is baseband, extending from greater than 1 Hz to less than 20 Hz.

10. The touch panel of claim 1, where the set of rows and the set of columns are used to determine both the magnitude of the touch force and the location of the touch force.

11. The touch panel of claim 1, where the piezoelectric layer further comprises:
   a metallization layer to form the set of force determination pixels.

12. A device, comprising:
   a cover layer, of a plurality of layers, to receive a touch force applied to the device;
   a capacitive touch set of layers to determine a location of the touch force; and
   a force determination set of layers, of the plurality of layers, configured to determine a magnitude of the touch force applied to the device,
      the force determination set of layers being disposed between the cover layer and a display of the device,
      the force determination set of layers including:
         a piezoelectric layer with a set of force determination pixels,
            the set of force determination pixels being arranged in a matrix, with a set of rows and a set of columns, to address the set of force determination pixels,
            a force determination pixel, of the set of force determination pixels, to generate a charge for determining the location, relative to the set of rows and the set of columns, of the touch force applied to the device and a magnitude of the touch force applied to the device,
   where the capacitive touch set of layers and the force determination set of layers further comprise:

a set of first amplifiers capacitively coupled to corresponding rows, of the set of rows, to excite each row with a touch transmit waveform, a set of second amplifiers capacitively coupled to corresponding columns, of the set of columns, to read out the touch transmit waveforms, a set of switches corresponding to the set of columns to connect a set of third amplifiers to a corresponding column, of the set of columns, during force readout when the touch transmit waveform is not being provided.

13. The device of claim 12, where the force determination set of layers further comprises:

a set of switches corresponding to the set of rows to determine a row, of the set of rows, corresponding to the location of the touch force, the row including one or more force determination pixels of the set of force determination pixels.

14. The device of claim 13, further comprising:

a controller to actuate the set of switches to determine the location of the touch force.

15. The device of claim 12, where the force determination set of layers further comprises:

a set of amplifiers with a set of charge-integrating circuits and a set of reset switches to perform a force readout of the set of force determination pixels and to provide an indication of the location of the touch force based at least in part on performing the force readout.

16. The device of claim 12, where the force determination set of layers is a transparent set of layers.

17. The device of claim 12, where the capacitive touch set of layers and the force determination set of layers share at least one common layer, the device to use a first range of signal frequencies to determine the location of the touch force via the capacitive touch set of layers, the device to use a second range of signal frequencies to determine the magnitude of the touch force via the force determination set of layers, the first range of signal frequencies and the second range of signal frequencies being mutually exclusive.

18. The device of claim 12, where the second range of signal frequencies is baseband, extending from greater than 1 Hz to less than 20 Hz.

19. The device of claim 12, where the set of rows and the set of columns are used to determine both the magnitude of the touch force and the location of the touch force.

20. The device of claim 12, where the piezoelectric layer further comprises:

a metallization layer to form the set of force determination pixels.

21. An apparatus, comprising:

a cover layer, of a plurality of layers, to receive a touch force applied to the apparatus;

a capacitive touch set of layers to determine a location of the touch force; and a force determination set of layers, of the plurality of layers, configured to determine a magnitude of the touch force applied to the apparatus, a display of the apparatus being disposed between the force determination set of layers and the cover layer, the force determination set of layers including:

a piezoelectric layer with a set of force determination pixels, the set of force determination pixels being arranged in a matrix, with a set of rows and a set of columns, to address the set of force determination pixels, a force determination pixel, of the set of force determination pixels, to generate a charge for determining a location, relative to the set of rows and the set of columns, of the touch force applied to the apparatus and a magnitude of the touch force applied to the apparatus, where the capacitive touch set of layers and the force determination set of layers further comprise:

a set of first amplifiers capacitively coupled to corresponding rows, of the set of rows, to excite each row with a touch transmit waveform, a set of second amplifiers capacitively coupled to corresponding columns, of the set of columns, to read out the touch transmit waveforms, a set of switches corresponding to the set of columns to connect a set of third amplifiers to a corresponding column, of the set of columns, during force readout when the touch transmit waveform is not being provided.

22. The apparatus of claim 21, where the force determination set of layers further comprises:

a set of switches corresponding to the set of rows to determine a row, of the set of rows, corresponding to the location of the touch force, the row including one or more force determination pixels of the set of force determination pixels.

23. The apparatus of claim 22, further comprising:

a controller to actuate the set of switches to determine the location of the touch force.

24. The apparatus of claim 21, where the force determination set of layers further comprises:

a set of amplifiers with a set of charge-integrating circuits and a set of reset switches to perform a force readout of the set of force determination pixels and to provide an indication of the location of the touch force based at least in part on performing the force readout.

25. The apparatus of claim 21, where the capacitive touch set of layers and the force determination set of layers share at least one common layer, the apparatus to use a first range of signal frequencies to determine the location of the touch force via the capacitive touch set of layers, the apparatus to use a second range of signal frequencies to determine the magnitude of the touch force via the force determination set of layers, the first range of signal frequencies and the second range of signal frequencies being mutually exclusive.

26. The apparatus of claim 25, where the second range of signal frequencies is baseband, extending from greater than 1 Hz to less than 20 Hz.

27. The apparatus of claim 21, where the set of rows and the set of columns are used to determine both the magnitude of the touch force and the location of the touch force.

28. The apparatus of claim 21, further comprising:

a set of switches, such that the set of switches are to combine a plurality of force determination pixels, of the set of force determination pixels, into a single force determination pixel to determine the magnitude of the touch force, and such that the set of switches are not to combine the plurality of force determination pixels into the single force determination pixel to determine the location of the touch force.

29. The apparatus of claim 21, where the piezoelectric layer further comprises:
a metallization layer to form the set of force determination pixels.

30. The apparatus of claim 21, further comprising:
a controller to determine a magnitude of the touch force based on a differential between a first force readout and a second force readout.

* * * * *